(12) United States Patent
Alperin et al.

(10) Patent No.: US 7,120,805 B2
(45) Date of Patent: Oct. 10, 2006

(54) DRAINING RESIDUAL CHARGE FROM A VOLTAGE PLANE

(75) Inventors: Joshua N. Alperin, Round Rock, TX (US); Glenroy Devonish, Round Rock, TX (US); Ajay Kwatra, Austin, TX (US); Todd W. Schlottman, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 481 days.

(21) Appl. No.: 10/412,526

(22) Filed: Apr. 11, 2003

(65) Prior Publication Data

US 2004/0205363 A1   Oct. 14, 2004

(51) Int. Cl.
*G06F 1/26* (2006.01)
*H03L 5/00* (2006.01)

(52) U.S. Cl. ...................... 713/300; 327/309
(58) Field of Classification Search ............... 713/300; 327/427, 309; 361/1
See application file for complete search history.

(56) References Cited

U.S. PATENT DOCUMENTS

| | | | |
|---|---|---|---|
| 4,716,495 A * | 12/1987 | Craker | 361/725 |
| 4,910,634 A * | 3/1990 | Pipkorn | 361/147 |
| 4,984,041 A | 1/1991 | Hack et al. | 357/23.7 |
| 5,151,614 A * | 9/1992 | Yamazaki et al. | 327/143 |
| 5,297,082 A | 3/1994 | Lee | 365/185 |
| 5,401,714 A | 3/1995 | Chaudhari et al. | 505/193 |
| 5,445,981 A | 8/1995 | Lee | 437/43 |
| 5,596,213 A | 1/1997 | Lee | 257/316 |
| 5,807,778 A | 9/1998 | Lee | 438/257 |
| 5,900,768 A * | 5/1999 | Price | 327/427 |
| 6,069,819 A | 5/2000 | Tiwari | 365/149 |
| 2002/0188876 A1 * | 12/2002 | Forbes et al. | 713/320 |

OTHER PUBLICATIONS

IEEE 100 The Authoritative Dictionary of IEEE Standards Terms, 2000, Standards Information Network IEEE Press, Seventh Ed, pp. 289 and 384.*

* cited by examiner

*Primary Examiner*—Chun Cao
*Assistant Examiner*—Mark Connolly
(74) *Attorney, Agent, or Firm*—Baker Botts L.L.P.

(57) ABSTRACT

An energy discharge resistance is isolated from storage capacitance containing a voltage charge until power is removed from the storage capacitance. Then the discharge resistance may be coupled to the storage capacitance to drain residual charge therefrom. The discharge resistance is coupled to the storage capacitance when external power is removed and is un-coupled from the storage capacitance when external power is applied to the storage capacitance. In this way, unnecessary power draw during operation or standby of an electronic system is substantially eliminated.

13 Claims, 5 Drawing Sheets

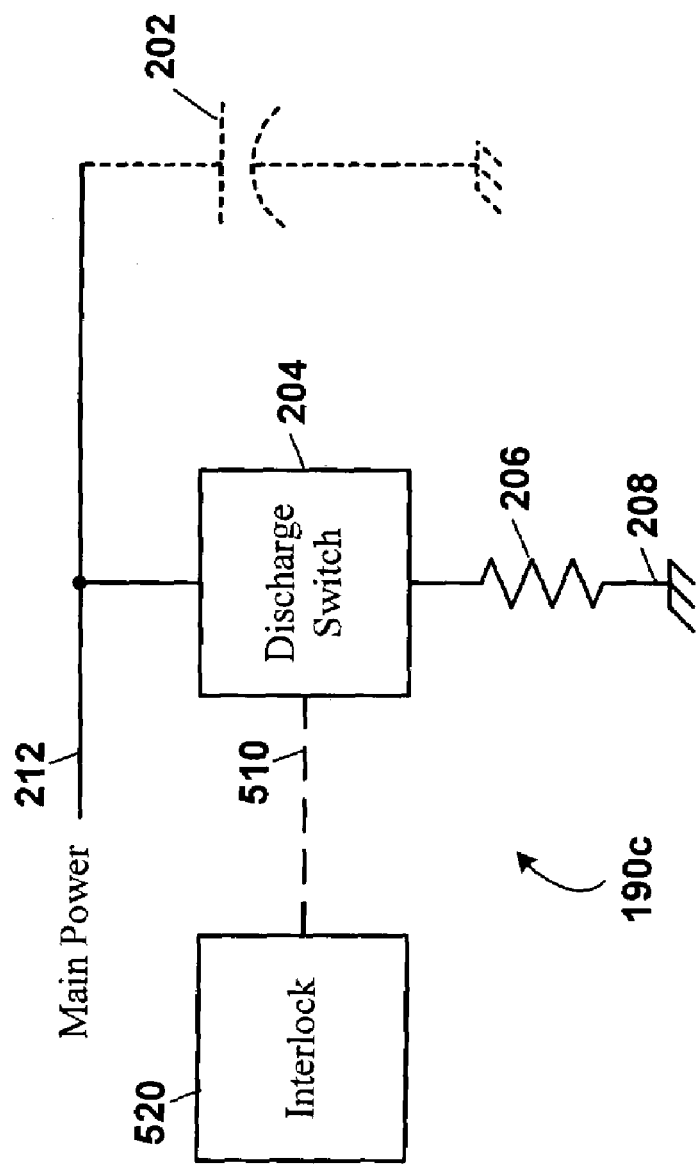

DRAINING RESIDUAL CHARGE FROM A VOLTAGE PLANE

BACKGROUND OF THE INVENTION TECHNOLOGY

1. Field of the Invention

The present invention is related to information handling systems, and more specifically, to draining residual power from voltage planes in the information handling systems.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems, e.g., computer, personal computer workstation, portable computer, computer server, print server, network router, network hub, network switch, storage area network disk array, RAID disk system and telecommunications switch.

As the computing power of information handling systems increase, a corresponding increase in power is required to operated these information handling systems. Typically, power supplies of the information handling systems have large amounts of storage capacitance to provide stable voltages during operation thereof. The energy stored the capacitance of the information handling system must be drained away in order to allow safe interaction with the hardware of the information handling systems for maintenance, repair, testing, adjustment, upgrading, etc. Heretofore, resistors were connected across the storage capacitance to bleed off the voltage of the energy stored therein. These resistors served no useful purpose except as a safety device to drain the voltage charge. The resistors increased power usage of the equipment during operation thereof and added to the equipment heat load that required additional cooling. Economics and government regulations require that system power be reduced to the minimum necessary for proper operation. Thus, during operation of the information handling equipment, having parasitic power drains from voltage bleeder resistors connected across the power supply storage capacitance is no longer tolerable.

Therefore, what is needed is a solution for eliminating the parasitic power drains caused by bleeder resistors across power supply storage capacitance, and to insure that energy stored in the storage capacitance is safely and quickly drained when the equipment of the information handling system is shutdown for service, adjustment or replacement.

SUMMARY OF THE INVENTION

The present invention remedies the shortcomings of the prior art by providing for draining residual charge from a voltage plane when equipment of the information handling system is shutdown for service, adjustment or replacement without incurring wasteful and unnecessary parasitic power drains when the equipment is operating or in standby.

In an exemplary embodiment of the present invention, a switch connects an additional resistive load across the storage capacitance in equipment of the information handling system to drain the energy stored therein when the equipment is shutdown for service, adjustment or replacement. The switch may be controlled by the loss of auxiliary power indicating that an external power source has been removed or turned off. Thus a lack of input voltage will automatically switch the additional resistive load to safely and quickly drain the energy stored in the capacitance of the equipment. The switch may be a relay; transistor, either bipolar or field effect; a silicon controlled rectifier and the like.

In another exemplary embodiment of the present invention, a switch connects an additional resistive load across the storage capacitance in equipment of the information handling system to drain the energy stored therein when their is access to internal parts of the equipment. The switch may be controlled by an interlock, e.g., when a cover is removed from a chassis of the equipment. Thus any access to the internal parts of the equipment automatically switch the additional resistive load to safely and quickly drain the energy stored in the capacitance of the equipment. The switch may be a relay; transistor, either bipolar or field effect; a silicon controlled rectifier and the like. The interlock may be mechanical, optical, electrical, etc. The interlock and switch may be combined into one subassembly which is coupled mechanically and electrically to the equipment of the information handling system, and is automatically actuated when there is an access to the internal parts of the equipment.

The bleeder resistor, according to the present invention, may be lower in resistance value than what was typically connected across the storage capacitance. This lower resistance allows more rapid discharge of the energy stored in the capacitance, and further reduces risk to personnel and equipment from accidental contact with a still charged circuit in the equipment of the information handling system.

A technical advantage of the present invention is reduced power consumption of the equipment during operation and standby conditions. Another technical advantage is more rapid discharge of the energy stored in the capacitance of the equipment. Still another technical advantage is automatic discharge of the energy stored in the capacitance of the equipment. Other technical advantages should be apparent to one of ordinary skill in the art in view of what has been disclosed herein.

BRIEF DESCRIPTION OF THE DRAWINGS

A more complete understanding of the present disclosure and advantages thereof may be acquired by referring to the following description taken in conjunction with the accompanying drawings wherein:

FIG. 5 is a schematic block diagram of another exemplary embodiment of the present invention.

Figure 1:
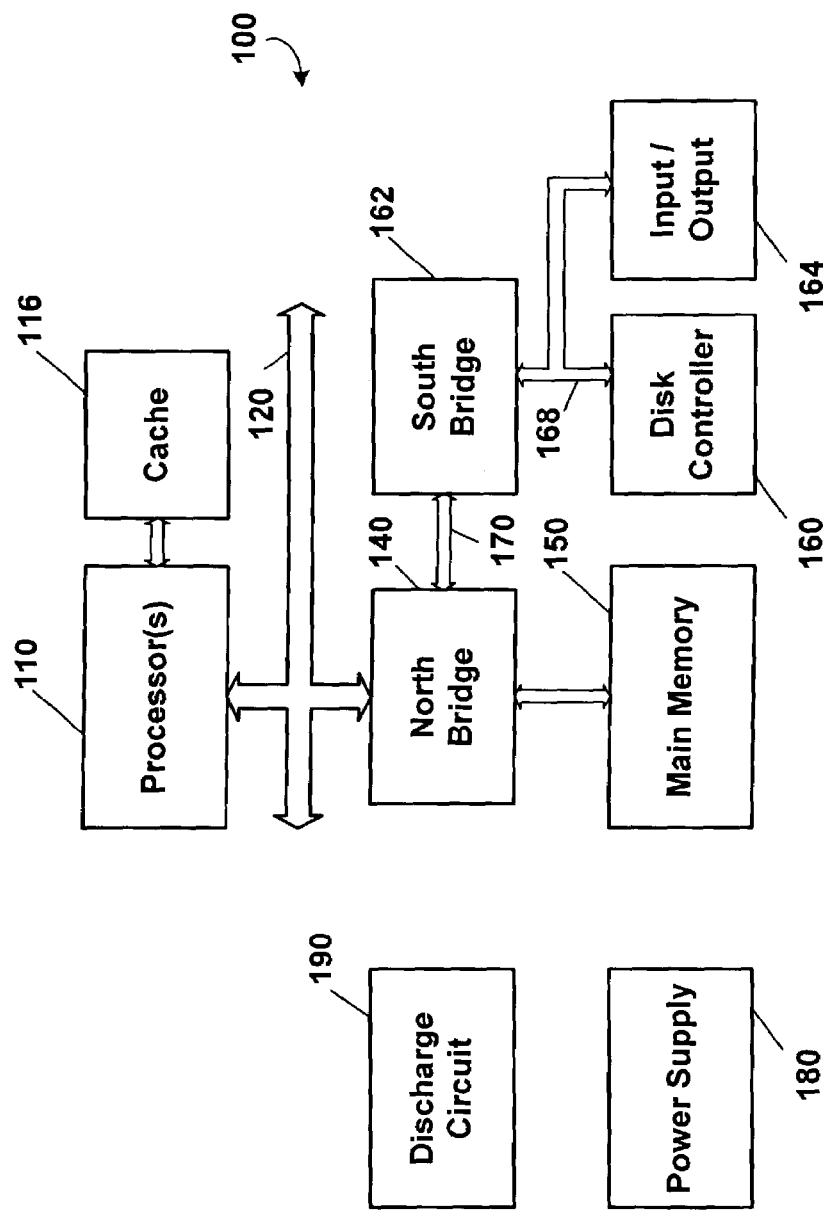
FIG. 1 is a schematic block diagram of an exemplary embodiment of an information handling system.

The present invention may be susceptible to various modifications and alternative forms. Specific exemplary embodiments thereof are shown by way of example in the drawing and are described herein in detail. It should be understood, however, that the description set forth herein of specific embodiments is not intended to limit the present invention to the particular forms disclosed. Rather, all modifications, alternatives, and equivalents falling within the spirit and scope of the invention as defined by the appended claims are intended to be covered.

DETAILED DESCRIPTION OF SPECIFIC EMBODIMENTS

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU), hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring now to the drawings, the details of an exemplary embodiments of the present invention are schematically illustrated. Like elements in the drawings will be represented by like numbers, and similar elements will be represented by like numbers with a different lower case letter suffix.

Referring to FIG. 1, an information handling system is illustrated having electronic components mounted on at least one printed circuit board (PCB) (motherboard) and communicating data and control signals therebetween over signal buses. In one embodiment, the information handling system is a computer system. The information handling system, generally referenced by the numeral 100, comprises a processor(s) 110 coupled to a host bus(es) 120 and a cache memory 116. A north bridge(s) 140, which may also be referred to as a memory controller hub or a memory controller, is coupled to a main system memory 150. The north bridge 140 is coupled to the system processor(s) 110 via the host bus(es) 120. The north bridge 140 is generally considered an application specific chip set that provides connectivity to various buses, and integrates other system functions such as a memory interface. For example, an Intel 820E and/or 815E chip set, available from the Intel Corporation of Santa Clara, Calif., provides at least a portion of the north bridge 140. The chip set may also be packaged as an application specific integrated circuit (ASIC). The north bridge 140 typically includes functionality to couple the main system memory 150 to other devices within the information handling system 100. Thus, memory controller functions such as main memory control functions typically reside in the north bridge 140. In addition, the north bridge 140 provides bus control to handle transfers between the host bus 120 and a second bus(es), e.g., PCI bus 170, AGP bus coupled to graphics display (not shown), etc. A second bus(es) 168 may also comprise other industry standard buses or proprietary buses, e.g., ISA, SCSI, USB buses through a south bridge(s) (bus interface) 162. These secondary buses 168 may have their own interfaces and controllers, e.g., ATA disk controller 160 and input/output interface(s) 164, and interface with a disk controller, a network interface card, a graphics controller, a hard disk and the like.

In the information handling system 100, according to the present invention, at least one modular power supply 180 is coupled to electronic components comprising the aforementioned subsystems. A discharge circuit 190 may be coupled to the aforementioned subsystems, or each one of the subsystems that are in modular form, e.g., may be individually replaced, may have a discharge circuit 190 coupled thereto.

Figure 2:
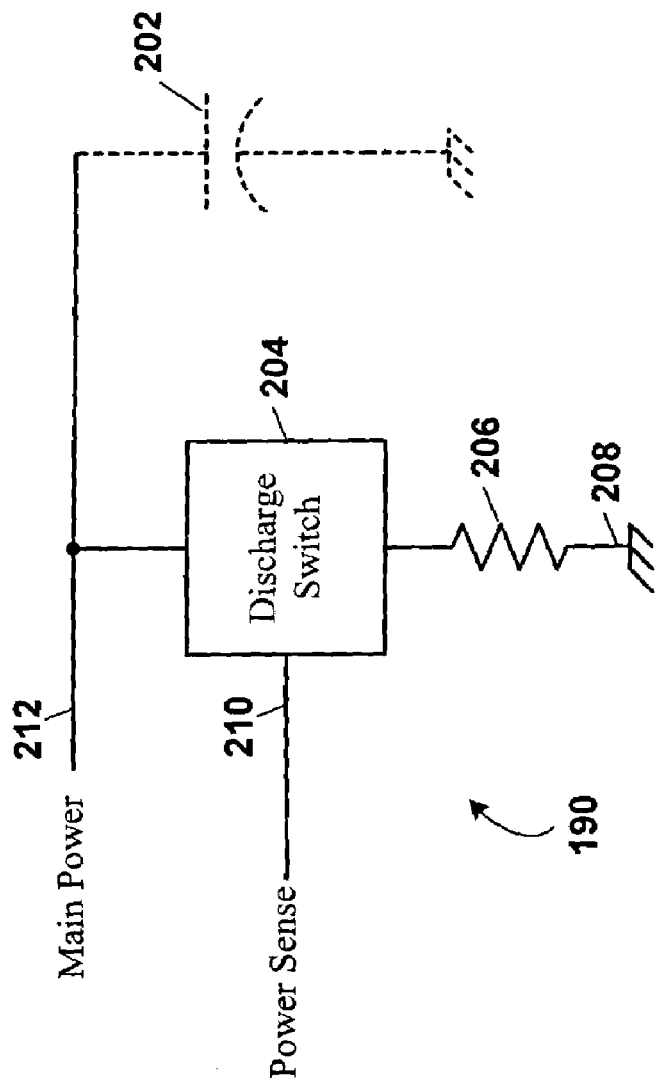
FIG. 2 is a schematic block diagram of an exemplary embodiment of the present invention.

Referring to FIG. 2, depicted is an exemplary embodiment of an energy discharge switch, according to the present invention. An energy discharge system, generally represented by the numeral 190, is adapted to rapidly and safely discharge the energy (voltage) stored in a capacitance 202 of the subsystems of the information handling system 100. The discharge system 190 comprises a discharge switch 204 that is coupled to the main power circuit 212 supplying power (e.g., power source) to a subsystem and its associated capacitance 202. The discharge switch 204 is also coupled to a discharge resistor 206 which is coupled to a common voltage plane 208, e.g., ground plane of a printed circuit board (not shown), power supply return, etc. According to the present invention, when a power sense signal 210 indicates that main power 212 is present, the discharge switch 204 remains open and the discharge resistor 206 is not coupled to the capacitance 202. When the power sense signal 210 indicates that main power is no longer present, the discharge switch 204 closes and the discharge resistor 206 is then coupled to the capacitance 202, thereby rapidly and safely discharging the stored energy charge therein. Since the resistor 206 is not coupled to the main power 212 during operation and standby conditions of the subsystems of the information handling system 100, no wasteful power is drawn by the resistor 206. In addition, the resistor 206 may have a lower resistance value than what would be normally used if it were continuously connected to the main power 212, whether the power be on or off. Since the resistor 206 can have a lower resistance, discharging the energy stored in the capacitance may occur more rapidly than could be done previously. Thus reducing the discharge time increase safety to personnel and the equipment being serviced, adjusted or replaced.

The capacitance 202, generally, comprise filtering and bypass capacitors located on printed circuit boards (not shown) comprising the subsystems of the information handling system 100. The filtering and bypass capacitors are generally connected between a voltage plane and a ground or power supply return plane of the printed circuit board (not shown). When a subsystem printed circuit board is accessed, serviced, or replaced, the energy (voltage charge) stored in the capacitance 202 of the subsystem printed circuit board should be discharged or dissipated so as not to cause harm to personnel handling the subsystem printed circuit board or cause damage to the components and/or printed circuit wire traces of the printed circuit board caused by a high current short or arc. By discharging the capacitance 202 through the resistor 206 when main power 212 is removed and the subsystem printed circuit board is accessed, the harm to personnel and/or equipment is greatly reduced.

The discharge switch may be comprised of a relay contact, a silicon-controller rectifier (SCR), a bipolar transistor, a junction field effect transistor, a power metal-oxide semiconductor field effect transistor MOSFET, either enhancement or depletion mode, an insulated gate MOSFET, and the like.

Figure 3:
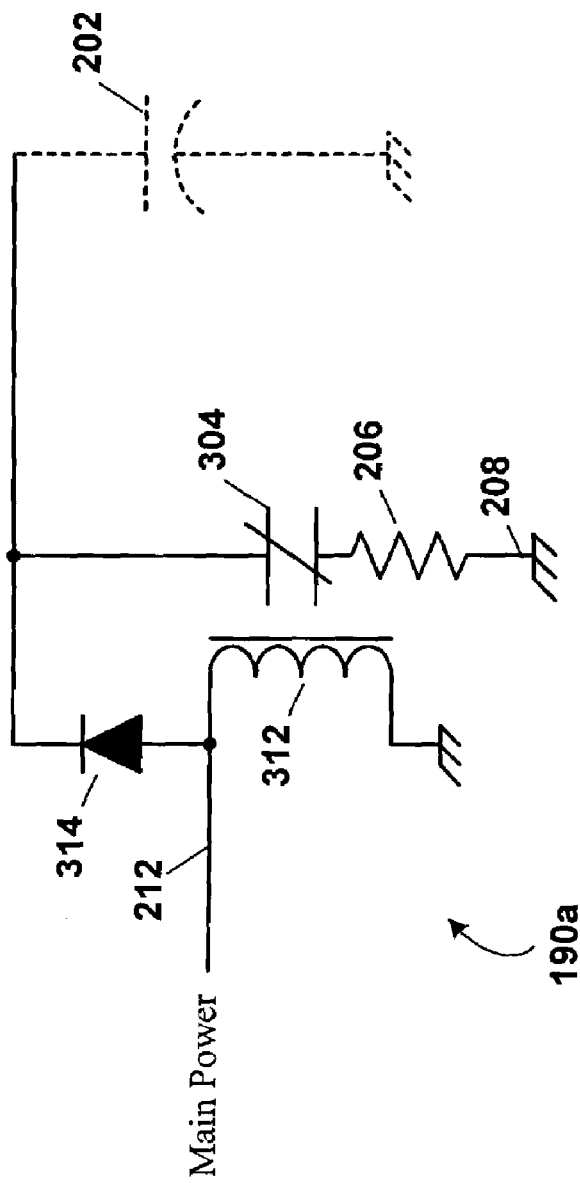
FIG. 3 is a schematic diagram of an exemplary implementation of the embodiment of FIG. 2.
Figure 4:
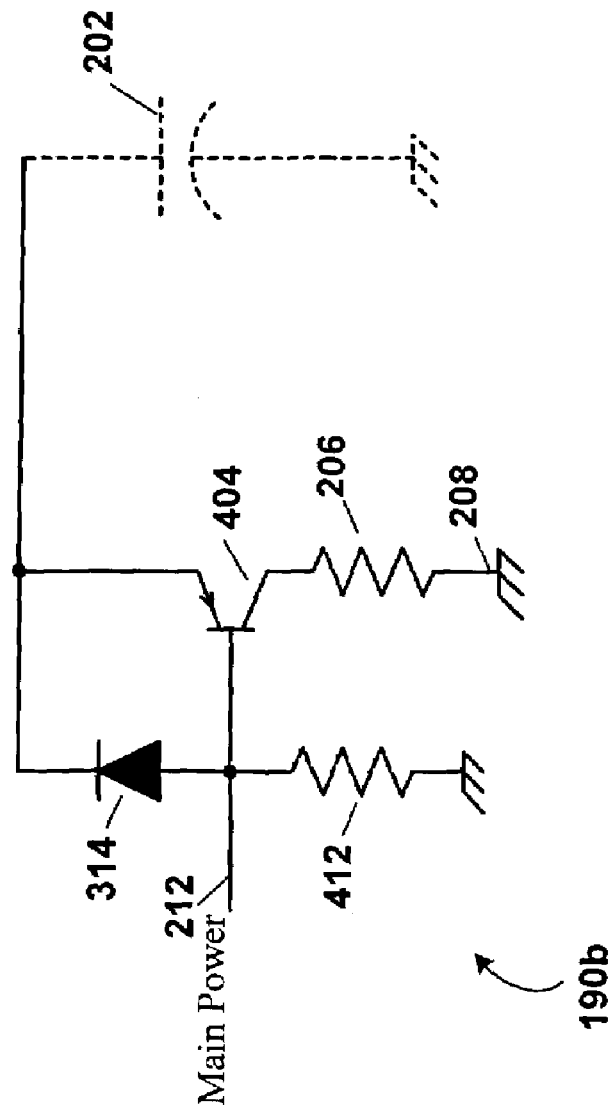
FIG. 4 is a schematic block diagram of another exemplary implementation of the embodiment of FIG. 2.

Referring to FIG. 3, depicted is an exemplary implementation of the embodiment of FIG. 2. A normally closed relay contact 304 and relay coil 312 are used as the discharge switch 204. When main power 212 is applied to the relay coil 312 and to the cathode of diode 314, the normally closed relay contact 304 opens and power (voltage and current) passes through the diode 314 to the capacitance 202. When main power 212 is removed, the relay coil 312 is de-energized and the diode 314 blocks any voltage charge stored in the capacitance 202. Once the relay coil 312 de-energizes, the normally closed relay contact 304 closes and couples the discharge resistor 206 to the capacitance 202.

Referring to FIG. 5, depicted is another exemplary implementation of the embodiment of FIG. 2. A PNP bipolar transistor 404 is used as the discharge switch 204. When main power 212 is applied to the base of transistor 404 and to the cathode of diode 314, the transistor 404 is in an off state and power (voltage and current) passes through the diode 314 to the capacitance 202. When main power 212 is removed, the base of transistor 404 is pulled to ground 208 through resistor 412, and the transistor 404 is now in the on state. The diode 314 blocks any voltage charge stored in the capacitance 202. Once the transistor 304 is in the on state, the discharge resistor 206 is coupled to the capacitance 202.

Referring to FIG. 5, depicted is a schematic block diagram of another exemplary embodiment of the present invention. An energy discharge system, generally represented by the numeral 190a, is adapted to rapidly and safely discharge the energy (voltage) stored in a capacitance 202 of the subsystems of the information handling system 100. The discharge system 190a comprises a discharge switch 204 and an interlock 520. The discharge switch 204 is coupled to the main power circuit 212 supplying power (e.g., power source) to a subsystem and its associated capacitance 202. The discharge switch 204 is also coupled to a discharge resistor 206 which is coupled to a common voltage plane 208, e.g., ground plane of a printed circuit board (not shown), power supply return, etc. According to the present invention, when the interlock senses that the subsystem of the information handling system 100 is being accessed, the discharge switch 204 closes and the discharge resistor 206 is coupled to the capacitance 202, thereby rapidly and safely discharging the stored energy charge therein. The interlock 520 may be also sense that the main power 212 has been disconnected before signaling the discharge switch 204 to close. Furthermore, the interlock 520 may prevent access to the subsystem until the main power 212 has been disconnected. This will prevent the discharge switch 204 connecting the discharge resistor 206 while the main power 212 is still coupled to the subsystem of the information handling system 100. The interlock 520 may also disconnect the main power 212 when the interlock 520 is actuated by access to the subsystem.

Since the discharge resistor 206 is not coupled to the main power 212 during operation and standby conditions of the subsystems of the information handling system 100, no wasteful power is drawn by the resistor 206. In addition, the resistor 206 may have a lower resistance value than what would be normally used if it were continuously connected to the main power 212, whether the power be on or off. Since the resistor 206 can have a lower resistance, discharging the energy stored in the capacitance may occur more rapidly than could be done previously. Thus reducing the discharge time increase safety to personnel and the equipment being serviced, adjusted or replaced.

The invention, therefore, is well adapted to carry out the objects and to attain the ends and advantages mentioned, as well as others inherent therein. While the invention has been depicted, described, and is defined by reference to exemplary embodiments of the invention, such references do not imply a limitation on the invention, and no such limitation is to be inferred. The invention is capable of considerable modification, alteration, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. An information handling system having subassemblies with power source storage capacitance therein, said system comprising:

at least one subassembly of an information handling system, the at least one subassembly having power source storage capacitance therein, the power source storage capacitance being adapted for coupling to a single voltage power source through a power diode;

a discharge switch coupled to the storage capacitance; and a discharge resistance coupled to the discharge switch, wherein when the power source is coupled to the power diode said discharge switch de-couples said discharge resistance from the storage capacitance, and when the power source is not coupled to the power diode said discharge switch couples said discharge resistance to the storage capacitance, thereby draining residual voltage therefrom.

2. The information handling system according to claim 1, wherein said discharge switch is a bipolar transistor.

3. The information handling system according to claim 1, wherein said discharge switch is a relay contact.

4. The information handling system according to claim 1, wherein said discharge switch is a junction field effect transistor.

5. The information handling system according to claim 1, wherein said discharge switch is a metal-oxide semiconductor field effect transistor (MOSFET).

6. The information handling system according to claim 1, wherein said discharge switch is controlled with a power sense signal from the single voltage power source.

7. The information handling system according to claim 1, wherein said discharge switch is further controlled by an interlock that detects access to the at least one subassembly.

8. The information handling system according to claim 7, wherein said interlock detects whether the single voltage power source is coupled to the power diode.

9. The information handling system according to claim 1, wherein the at least one subassembly is selected from the group consisting of a processor, memory, a north bridge, a south bridge, a disk controller, a network interface card, a graphics controller and a hard disk.

10. An apparatus for draining residual voltage charge from a voltage plane, comprising:
   a discharge switch adapted to be coupled to a storage capacitance coupled to a voltage plane; and
   a discharge resistance coupled to the discharge switch, wherein
      when a single voltage power source is coupled to the voltage plane through a power diode said discharge switch de-couples said discharge resistance from the storage capacitance, and
      when the power source is not coupled to the voltage plane through the power diode said discharge switch couples said discharge resistance to the storage capacitance, thereby draining residual voltage therefrom.

11. The apparatus according to claim 10, wherein said discharge switch automatically opens when the single voltage power source is coupled to the voltage plane through the power diode, and automatically closes when the single voltage power source is not coupled to the voltage plane through the power diode.

12. The apparatus according to claim 10, wherein discharge switch is controlled by an interlock that detects access to the voltage plane.

13. The apparatus according to claim 10, wherein said interlock detects whether the single voltage power source is coupled to the voltage plane through the power diode.

* * * * *